United States Patent
Stocker

(10) Patent No.: US 8,428,868 B2
(45) Date of Patent: Apr. 23, 2013

(54) METHOD AND SYSTEM FOR UPDATING CARD DATA OF A NAVIGATION SYSTEM

(75) Inventor: Konrad Stocker, Ergoldsbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 465 days.

(21) Appl. No.: 12/116,832

(22) Filed: May 7, 2008

(65) Prior Publication Data

US 2008/0208452 A1    Aug. 28, 2008

Related U.S. Application Data

(63) Continuation of application No. PCT/EP2006/009939, filed on Oct. 14, 2006.

(30) Foreign Application Priority Data

Nov. 8, 2005   (DE) .......................... 10 2005 053 125

(51) Int. Cl.
*G01C 21/00* (2006.01)
*G08G 1/123* (2006.01)

(52) U.S. Cl.
USPC .................................... 701/409; 340/995.19

(58) Field of Classification Search ...... 710/1, 200–226; 340/539.11, 539.2, 988–996; 701/1, 200–226, 701/30.5, 30.8, 31.1, 31.5, 32.3, 32.4, 32.5, 701/33.3, 33.7, 400, 408–415, 417, 420, 701/421, 422, 423, 425, 428, 429, 430, 432, 701/437, 442, 444, 445, 446–448, 450–455, 701/461, 463, 465, 467–470, 495, 518, 521, 701/FOR. 108, FOR. 109, FOR. 115, FOR. 116; 342/176, 352, 357.21–357.23, 357.25, 357.63; 455/456.1, 46

See application file for complete search history.

(56) References Cited

U.S. PATENT DOCUMENTS

| | | | |
|---|---|---|---|
| 5,948,042 A |   | 9/1999 | Heimann et al. |
| 6,034,626 A | * | 3/2000 | Maekawa et al. ........ 340/995.21 |

(Continued)

FOREIGN PATENT DOCUMENTS

| | | |
|---|---|---|
| DE | 195 25 291 C1 | 12/1996 |
| DE | 101 46 117 A1 | 4/2003 |

(Continued)

OTHER PUBLICATIONS

International Search Report dated Dec. 22, 2006 including English translation (Four (4) pages).

(Continued)

*Primary Examiner* — James Trammell
*Assistant Examiner* — Muhammad Shafi
(74) *Attorney, Agent, or Firm* — Crowell & Moring LLP

(57) ABSTRACT

A method and system for updating map data of a navigation system in a vehicle is provided. A first version of map data is stored in a memory device of the navigation system, and a first version of map data and a second more recent version of map data are stored in a memory device of a map server. A first route to a driving destination is determined by the map server on the basis of the first version of the map data. A second route to the driving destination is determined by the map server on the basis of the second more recent version of the map data, and the second version of map data and/or route data, which describe the second route, are transmitted at least partially to the navigation system as a function of the degree of agreement between the first route and the second route.

11 Claims, 2 Drawing Sheets

U.S. PATENT DOCUMENTS

| | | |
|---|---|---|
| 6,662,105 B1 | 12/2003 | Tada et al. |
| 2002/0065691 A1* | 5/2002 | Twig et al. .................. 705/7 |
| 2002/0152022 A1* | 10/2002 | Seto et al. .................. 701/208 |
| 2003/0149743 A1* | 8/2003 | Baluja et al. ................ 709/217 |
| 2004/0030493 A1* | 2/2004 | Pechatnikov et al. ....... 701/208 |
| 2004/0267441 A1* | 12/2004 | Kim .......................... 701/200 |
| 2005/0033511 A1* | 2/2005 | Pechatnikov et al. ....... 701/210 |
| 2005/0203937 A1* | 9/2005 | Nomura ..................... 707/102 |
| 2007/0126605 A1 | 6/2007 | Aleksic et al. |

FOREIGN PATENT DOCUMENTS

| | | |
|---|---|---|
| DE | 103 37 622 A1 | 3/2005 |
| DE | 103 37 621 A1 | 4/2005 |
| EP | 1 102 036 B1 | 5/2001 |
| EP | 1 102 228 A2 | 5/2001 |
| EP | 1 403 618 A2 | 3/2004 |
| EP | 1 464 922 A1 | 10/2004 |
| EP | 1 493 992 A2 | 1/2005 |

OTHER PUBLICATIONS

German Search Report dated Jul. 17, 2006 including English translation (Ten (10) pages).

* cited by examiner

METHOD AND SYSTEM FOR UPDATING CARD DATA OF A NAVIGATION SYSTEM

CROSS REFERENCE TO RELATED APPLICATIONS

This application is a continuation of PCT International Application No. PCT/EP2006/009939, filed Oct. 14, 2006, which claims priority under 35 U.S.C. §119 to German Patent Application No. 10 2005 053 125.3, filed Nov. 8, 2005, the entire disclosures of which are herein expressly incorporated by reference.

BACKGROUND AND SUMMARY OF THE INVENTION

The present invention relates to a method for updating map data of a navigation system and a system for updating map data of a navigation system.

Since the use of navigation systems in vehicles has been increasing for a long time, it has become increasingly necessary to update the map data, on the basis of which the navigation, the route search or the destination guidance is executed and which are stored in the navigation system, especially in older systems.

It is known to update the map data by exchanging for an appropriate exchange memory, such as a map data DVD (Digital Versatile Disc). This exchange is relatively expensive for the customer and the supplier, not case related, and is usually performed within the framework of relatively few versions per year, and hence, at relatively long time intervals.

Newer updating methods propose loading the data from a central server into the navigation system, for example, by means of a mobile radio system. Since for this purpose a large quantity of data is to be transmitted on a regular basis, this solution is associated with high costs and is quite time consuming for the user of the navigation system.

Against this background, an object of the invention is to provide a technical teaching, with which the map data of a navigation system can be updated in a convenient and economical way.

This object is achieved with the features disclosed in the independent claims. Advantageous further developments of the invention are disclosed in the dependent claims. At the same time further developments that are disclosed in the independent system-related claim and that correspond to the dependent method-related claims are also within the scope of the invention.

Hence, the invention is based on the core idea of maintaining not only the most recent version of the map data, but also older versions of the map data on a map server and to update the map data in a navigation system only if a map server-internal comparison between a first route, which was determined by the map server on the basis of an older version, which is also maintained in the navigation system, and a second route, which was determined by the map data on the basis of the updated version, results in a deviation—in particular, with respect to the route or the duration of the trip—that exceeds the threshold value.

The invention achieves this object in that the map data in the navigation system are not updated as a function of the version numbers or the defined time intervals, but rather the updating is need-based as a function of the specific utility of an update for the respective user of the navigation system.

Thus, for example, it is possible to suppress the updating of map data that relate to routes that are never driven by the user of the navigation system. In addition, it is possible to suppress an updating of map data that relate, for example, to an additional highway exit that the driver never takes, even though he routinely drives on the respective highway. In addition, it is possible to suppress an updating of map data that relate, for example, to the grading of a country road, but that has no influence or no significant influence on the driving time.

This case-dependent suppression of the transmission of map data, for example, by means of a mobile radio system, leads to a sizeable cost trimming (with respect to the transmission fees) and sharp decrease in the transmission time. Yet owing to the invention the user always receives automatically and transparently to him access to the map data, which has been updated with useful information for him, by means of the navigation system.

Several versions of the map data may be stored in the memory device of the map server. These versions comprise at least one version, which is stored in the navigation system, and a more recent version.

The driving destination may be entered by the user into the navigation system by means of an input device or automatically selected by the system itself or manually selected from a plurality of predetermined destinations.

The map data in the navigation system and in the map server do not have to be identical with respect to their regional coverage. However, they ought to overlap at least in one subarea.

The version of the map data that exists in the navigation system may be transferred with the driving destination to the map server; and on the basis of this version the first route may be determined in the map server.

The current position of the vehicle and/or the route criteria (fastest route, shortest route, . . . ) may be transmitted with the driving destination by the navigation system to the map server; and the map server determines the routes in consideration of these route criteria. The current position of the vehicle may also be determined by means of a satellite-based position determining system that is installed in the vehicle or may be inputted by the driver by means of an input device.

The degree of agreement between the first route and the second route may be determined on the basis of the duration of the trip, on the length of the route, on the fees that are incurred, etc. If the difference between the first and the second route with respect to one of these parameters exceeds a defined threshold value, then the second version of map data and/or route data that describe the second route is at least partially transmitted to the navigation system.

The transmission of the second version of map data and/or the route data that describe the second route may also be based on the transmission of the difference map data between the first and the second version. In this way the quantity of data to be transmitted can be reduced even more.

Map data may describe, according to the invention, any part or segment of map data—for example, relate only to certain regions, route segments or additional information, such as filling stations or points of interest.

Of course, the invention does not have to be executed every time a driving destination is selected, but rather may be executed, for example, only after permanently defined minimum time intervals, which may be determined on the basis of the destination.

According to one exemplary embodiment of the invention, several destinations are selected from a plurality of stored preferred favorite destinations, which follow automatically, for example, from a selection frequency in the past; and the respective appropriate destination data are transmitted to the map server. Then for each of these destinations the map server can determine, according to the invention, different routes from the map data on the basis of the different versions (e.g., first version and second version). As a function of the results from the respective comparison, an updating of the map data in the navigation system may or may not take place.

The aforementioned object is also achieved with a suitably configured system for updating the map data of a navigation system.

Other objects, advantages and novel features of the present invention will become apparent from the following detailed description of the invention when considered in conjunction with the accompanying drawings.

BRIEF DESCRIPTION OF THE DRAWINGS

The invention is explained below in detail by means of examples with reference to the following figures.

DETAILED DESCRIPTION OF THE DRAWING

Figure 1:
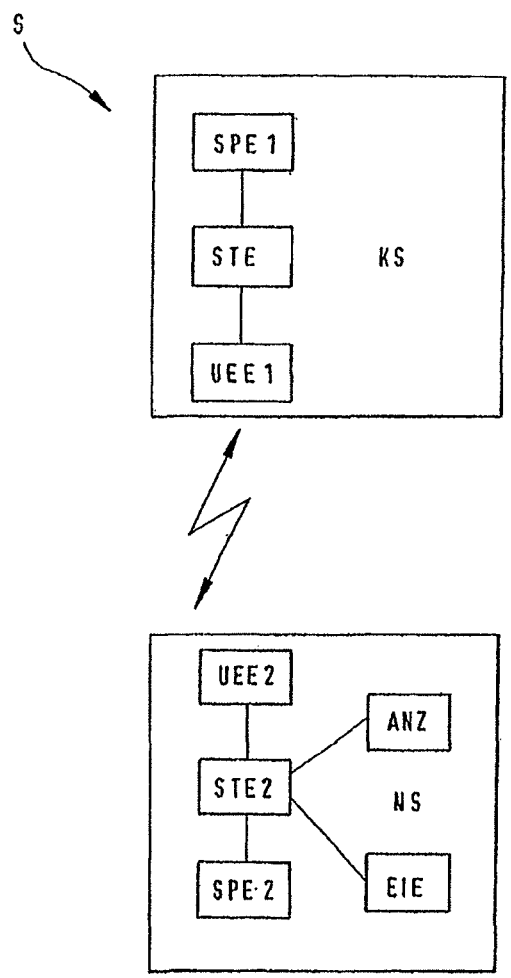
FIG. 1 is a schematic drawing of a system for updating map data.

FIG. 1 shows a system S for updating map data of a navigation system NS with a map server KS and a navigation system NS.

The map server KS includes a memory device SPE1, which can be designed as a hard disk-based database, in particular for segmented storage of a first version, for example dated Jan. 1, 2003, and for storage of at least a second more recent version, for example dated Jan. 1, 2005, of the map data. In addition, a version, dated Jan. 1, 2004, may also be stored. In this case the map data cover Europe in its entirety.

The navigation system NS includes a memory device SPE2, which may also be designed in the form of a hard disk-based database, in particular for segmented storage of a first version, for example dated Jan. 1, 2003, of the map data. In this case the map data cover Europe in its entirety. The navigation system NS and the methods that are executed with the navigation system may be controlled by means of a suitably configured control unit STE2.

The user of the navigation system NS may select a driving destination by means of an operating device, which includes a display unit ANZ and an input device EIE, such as a keyboard, a microphone or a joystick.

Destination data, which correspond to the driving destination, together with the current vehicle position data, the version date (Jan. 1, 2003) of the map data, stored in the navigation system NS, the selected route criteria (shortest expected driving time) and the communications address of the navigation system are automatically transmitted over a totally or partially line-dedicated communications network or a totally or partially radio-based communications network, especially with the use of a mobile radio network, to a map server KS by means of a transmission device UEE2.

This information is received by the map server KS by means of a transmission device UEE1 and forwarded to a control unit STE of the map server KS. The control unit STE may be designed as a program-controlled processor unit or as an application specific integrated circuit. In this case the control unit is configured in such a manner that, first of all, a first route to the driving destination, which is transmitted, is determined on the basis of the map data, which is stored in the memory device SPE and which corresponds to the first version (Jan. 1, 2003) that was sent. For comparison purposes a second route to the driving destination is determined by means of the control unit STE on the basis of the second more recent version (Jan. 1, 2005) of the map data.

In addition, the expected travel time is determined for both routes in accordance with the route criterion that was transmitted. At the same time the driving time scenario may include the known delays, which may be based, for example, on current traffic backup information, or also statistical data, such as day time specific speed profiles. If the expected driving time difference exceeds a specified threshold value, such as five minutes, then this means that with respect to the current driving request of the user of the navigation system NS the updating of map data that are stored in the navigation system NS justifies at least to some extent the expense for transmitting the corresponding data, since apparently the map data with respect to this request have changed significantly. For this reason, following the user's optional confirmation input, the second version of the map data and/or route data, which describe the second route, are automatically transmitted at least partially by the map server KS to the navigation system NS as a function of the design variant of the invention, and are stored in the navigation system; and a respective route or map image is displayed on the display unit ANZ. The transmission of the map data may take place again with the inclusion of a mobile radio network.

In this case the different components of the map server KS or the navigation system do not have to be disposed in a housing, but rather may be connected together only by communications means but implemented in a distributed manner.

The transmission device of especially the navigation system NS may be designed as a mobile telephone or as a mobile radio module (wireless module) and may also be used for other data transmission purposes.

The transmission of information between the map server KS and the navigation system NS may also be based at least to some extent on an Internet transmission. To this end the navigation system NS or the memory device SPE2 of the navigation system NS may be designed so as to be removable from the vehicle or from the navigation system NS and may be designed so as to be connectable, for example, to a personal computer or a modem.

Figure 2:
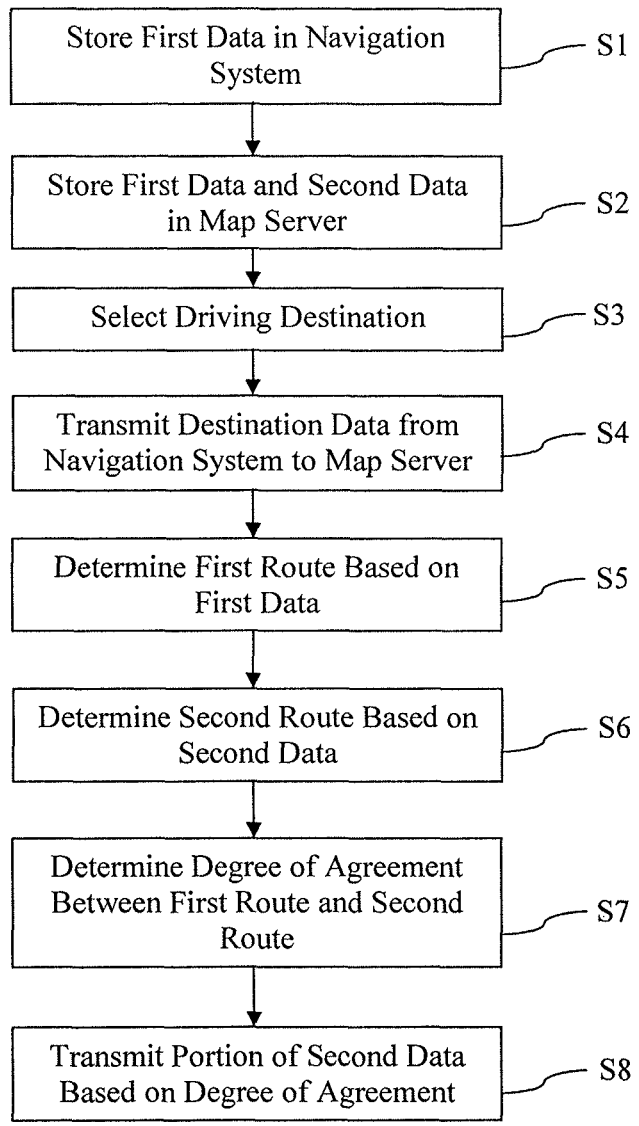
FIG. 2 is a schematic drawing of a method for updating map data.

FIG. 2 illustrates an embodiment of a method according to the present invention. In step S1, a first version of map data is stored in a memory device SPE 2 of the navigation system NS. In step S2, the first version of map data and a second more recent version of map data is stored in a memory device SPE 1 of a map server KS. A driving destination is selected on the navigation system NS in step S3. Destination data, which describe the driving destination, is transmitted in step S4 from the navigation system NS to the map server KS. In step S5, a first route to the driving destination is determined by the map server KS on the basis of the first version of the map data. In step S6, a second route to the driving destination is determined by the map server KS on the basis of the second more recent version of the map data. The degree of agreement between the first route and the second route is determined in step S7 by comparing the first route to the second route. In step S8, when the degree of agreement between the first route and the second route is less than a threshold value, a portion of at least one of the second version of map data and route data, which describe the second route, is transmitted from the map server KS to the navigation system NS based on difference map data between the first and second versions of the map data.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for updating map data of a navigation system in a vehicle, comprising the steps of:
    storing a first version of map data in a memory device of the navigation system;
    storing the first version of map data and a second more recent version of map data in a memory device of a map server;
    selecting a driving destination on the navigation system;
    transmitting destination data, which describe the driving destination, from the navigation system to the map server;
    determining a first route to the driving destination by the map server on the basis of the first version of the map data;
    determining a second route to the driving destination by the map server on the basis of the second more recent version of the map data;
    determining, by the map server, a degree of agreement between the first route and the second route by comparing the first route to the second route;
    transmitting a portion of at least one of the second version of map data and route data, which describe the second route, from the map server to the navigation system, based on difference map data between the first and second versions of the map data, when the degree of agreement between the first route and the second route is less than a threshold value; and
    suppressing the transmission to the navigation system of portions of the at least one of the second version of the map data and the route data that relate to routes that have not been driven by a user of the navigation system.

2. The method, as claimed in claim 1, wherein the driving destination is selected from a plurality of stored preferred destinations.

3. The method, as claimed in claim 2, wherein several driving destinations are selected from a plurality of stored preferred destinations; and the respective corresponding destination data are transmitted to the map server.

4. The method, as claimed in claim 3, wherein prior to deleting the first version of map data from the memory device of the map server, the second or a third version of the map data is transmitted to the navigation system.

5. The method, as claimed in claim 3, wherein the degree of agreement between two routes is determined on the basis of the route specific parameters, including at least one of travel duration, route length, and route fees.

6. The method, as claimed in claim 2, wherein prior to deleting the first version of map data from the memory device of the map server, the second or a third version of the map data is transmitted to the navigation system.

7. The method, as claimed in claim 2, wherein the degree of agreement between two routes is determined on the basis of the route specific parameters, including at least one of travel duration, route length, and route fees.

8. The method, as claimed in claim 1, wherein prior to deleting the first version of map data from the memory device of the map server, the second or a third version of the map data is transmitted to the navigation system.

9. The method, as claimed in claim 8, wherein the degree of agreement between two routes is determined on the basis of the route specific parameters, including at least one of travel duration, route length, and route fees.

10. The method, as claimed in claim 1, wherein the degree of agreement between two routes is determined on the basis of the route specific parameters, including at least one of travel duration, route length, and route fees.

11. The method, as claimed in claim 1, further comprising the act of suppressing the transmission to the navigation system of portions of the second version of the map data that do not affect driving time of the second route and the route data which describe the second route that do not effect the driving time of the second route.

* * * * *